United States Patent [19]

Mercado-Flores et al.

[11] 4,098,912

[45] Jul. 4, 1978

[54] PROCESS FOR THE PRODUCTION OF COCONUT CREAM

[75] Inventors: Ignacio Mercado-Flores; Sergio Carvallo-Garnica; Luis Eduardo Lara-Sanchez, all of Mexico City, Mexico

[73] Assignee: Banco De Mexico, S.A., Mexico City, Mexico

[21] Appl. No.: 701,439

[22] Filed: Jun. 30, 1976

[30] Foreign Application Priority Data

Jul. 14, 1975 [MX] Mexico .................................. 159584

[51] Int. Cl.² .............................................. A23B 7/08
[52] U.S. Cl. .................................... 426/617; 426/639; 426/431; 426/489
[58] Field of Search ............... 426/617, 586, 655, 431, 426/397, 489, 491, 495, 506, 518, 519, 482, 481

[56] References Cited

U.S. PATENT DOCUMENTS

| | | | |
|---|---|---|---|
| 1,366,339 | 1/1921 | Alexander | 426/489 |
| 2,426,834 | 9/1947 | Irizarry | 426/617 |
| 2,981,627 | 4/1961 | Wen | 426/519 |
| 3,655,409 | 4/1972 | Glasser | 426/617 |

FOREIGN PATENT DOCUMENTS 794,050  4/1958  United Kingdom ................. 426/617

*Primary Examiner*—Hiram H. Bernstein
*Attorney, Agent, or Firm*—Ladas, Parry, Von Gehr, Goldsmith & Deschamps

[57] ABSTRACT

An improved process is provided for producing edible coconut cream, which process improves the already known processes because the process of the instant invention is more efficient, the finished product is pasteurized and homogenized and in general terms the production costs involved are diminished. Likewise, the yield is normally higher than that obtained in the already known processes since the quality of the finished product is improved in view of its feeding and organoleptic outstanding properties.

8 Claims, 1 Drawing Figure

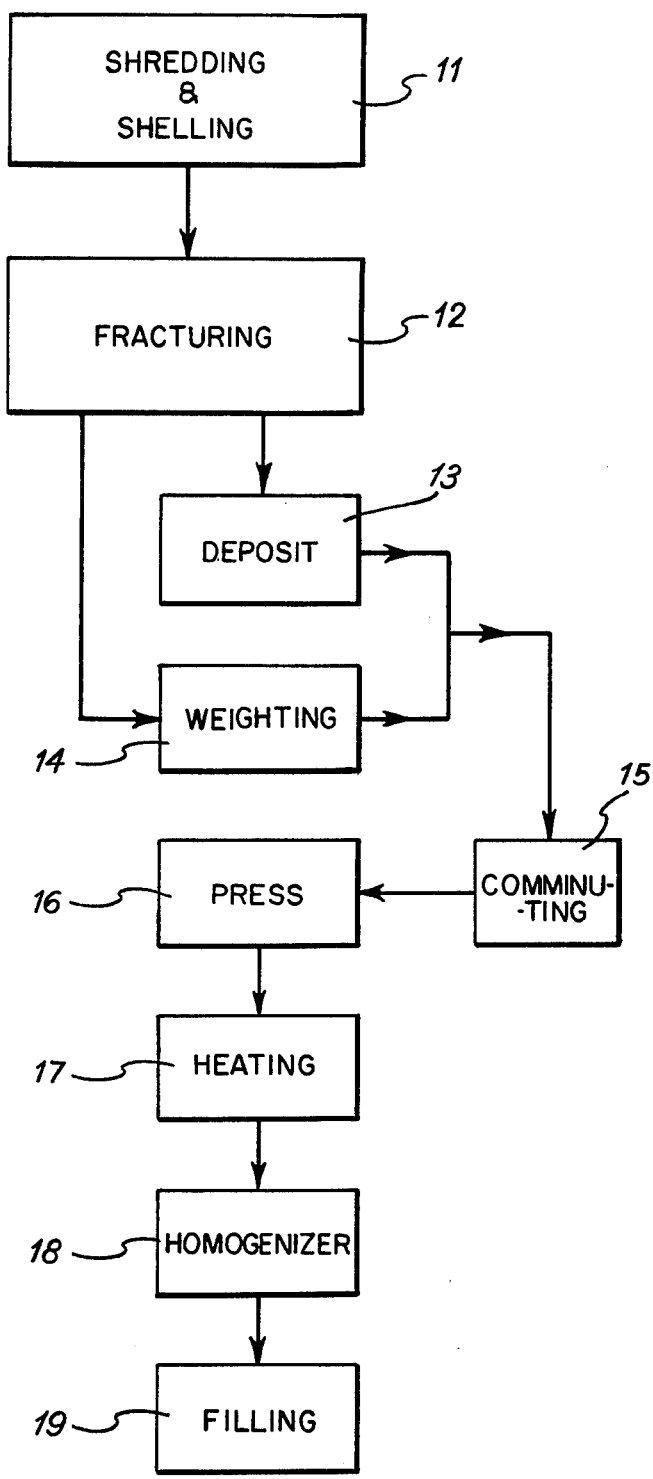

1

PROCESS FOR THE PRODUCTION OF COCONUT CREAM

BACKGROUND OF THE INVENTION

The utilization of coconut which is the fruit of the palm tree (*Cocous nucifera*) as a foodstuff in its natural state and also processed to a given degree, and hence up now, its nutritious and flavoring properties have been taken advantage of. Particularly well known is the so called coconut cream which is the pulp juice combined with an edulcorating or sweetening substance, which cream has a multiplicity of applications in the food industries.

In particular, the process disclosed in U.S. Pat. No. 2,426,834 is well known, which Patent is related to a process for the production of a food product derived from coconut. This process essentially consists in the steps of: shelling the coconut; scraping and triturating its pulp; expressing the pulp for obtaining a creamy juice; filtering said creamy juice, homogenizing it and mixing it with sugar in order to adjust the specific gravity of the cream to a pre-determined value. Optionally said cream may be further pasteurized something that constitutes an embodiment of said process. The prior art also includes U.S. Pat. No. 3,224,804 related with a method of shelling coconut, although this patent will not be cited in detail in view of the fact that its subject matter is not directly related with the process provided in the instant application.

In view of the prior art and of the necessity of obtaining a better quality product, as well as a more efficient and economical process, laborious experimentation with novel techniques has become necessary in order to obtain coconut cream, one of which, which happens to constitute an authentic industrial process, has been found and is disclosed in the present patent specification.

The novel process of the instant application overshadows the current processes due to the adequate industrial application of the novel technic which is disclosed. For instance, the prior art utilizes the shreddings that result from expressing to dryness the coconut pulp, washing it with the coconut juice, while in the new process, the fresh pulp is washed before expressing it. In the prior art, the shell grease is utilized as part of the process, which grease is discarded in the present invention thus avoiding undesirable coloration in the final product. In consequence, the prior art makes use of a preliminary process for obtaining the material that is going to serve as a base for the cream, whereas in the present invention this part of the process constitutes an aspect of major importance. Another additional advantage of the new process, is that the finished product is homogenized. The whole series of process' steps leads to a higher yield and economy for the production of a pasteurized, homogeneous, cleaner and better quality finished product.

SUMMARY OF THE INVENTION

One of the objects of the present invention is to provide an improved process for producing coconut cream, which process is carried out in an effective, fast and economical manner. A further object of the invention is to produce coconut cream whereby various aspects of the prior art are improved in order to obtain as the consequence, more satisfactory results.

Another object of the invention is related to the production of coconut cream by taking full advantage of the whole pulp and juice of said fruit, which are subjected to a novel sequence of steps and process conditions. The above and further objects of the invention are achieved by means of the industrial application of the novel technic disclosed which constitutes the main object of the present patent specification.

BRIEF DESCRIPTION OF THE DRAWINGS

In order to obtain a clear and thorough understanding of how the process of the instant invention is performed, a drawing is provided for the purpose of illustrating in a blocks diagram the sequence of steps of said process.

Block 11 refers to the first step which is that of shredding and shelling the coconut fruit, operation that may be performed either manual or mechanically. Block 12 represents the station where the coconut fruit is fractured and its juice separated and inspected regarding its quality whose clean juice is sent to deposit 13, discarding of course, that juice that is either turbid or spoiled. In deposit 13 the coconut juice is heated and fresh water is added until the pulp weight is equalized. The fresh pulp from station 12 is sent directly to station 14 where it is weighted. Afterwards the pulp is conveyed to mill 15 where it is comminuted and while in the mill, the hot clean coconut juice plus water from station 13 are added, while the whole is heated to boiling in order to improve the comminution action. After passing through the mill, the mixture is taken to press 16 from which undesired residue is discarded and the "coconut cream" comes out which is passed to container or bucket 17 where additives are added and the mixture is heated to a predetermined temperature, whereupon it is passed to a homogenizer 18, and finally to a filling station 19 wherein the product is poured into containers that thereafter are closed, being in this way, ready for their distribution.

DETAILED DESCRIPTION OF THE INVENTION

The practical realization of the process object of the present patent specification is carried out according to the following steps:

(a) First the fruit of the palm tree (Cocous nucifera) or coconut, is shredded and shelled, when the fruit is ripe, something that is done manual or mechanically in order to leave the only useful portion, the white fresh pulp containing juice in its inside;

(b) The coconut is cracked, separating the juice and using this juice only if it is clear and does not have an unpleasant odor, as otherwise the no good juice is discarded;

(c) The pulp is then weighted and a weight of juice equal to that of the pulp is established by adding natural fresh water to the coconut juice until the same pulp weight is reached;

(d) The coconut pulp is then comminuted in a hammer mill working at 10,000 rpm in the presence of a boiling mixture of the coconut juice and natural water, of step (e) in such a manner that the comminution of the pulp takes place in the presence of hot water;

(e) The comminuted pulp together with the hot water, is expressed under low pressure, utilizing preferably a horizontal press having an adjustable movable cone, whereby the liquid product resulting from the pressing step is called "coconut cream";

(f) The coconut cream is passed to a container or bucket having a vapor jacket wherein it is heated to a temperature near 74° C;

(g) Some additives are then added to the hot coconut cream, such as glucose, sucrose, glyceryl monoestearate, carboxymethylcellulose or mixtures thereof;

(h) The coconut cream together with its additives is stirred during about 10 minutes and then is immediately heated to a temperature near 87° C during a period of time preferably of 20 minutes;

(i) The liquid product of the above step is homogenized, optionally under a pressure of about 1500 to 10,000 lb/in².

(j) The homogenized product is then bottled or canned.

From the sequence of steps above described, the novelty of the invention is appreciated as well as its fundamental differences with respect to the prior art. Obviously, said steps may, in case of necessity, be exchanged or modified according to the particular needs of each case while it is understood that the working and physicochemical variables may be varied according to the equipment that may be available and in conformity with the improved practical results that may be achieved when modifying the process and/or its variables. It also may be understandable that any process that is carried out on the basis of the just disclosed process, falls within the scope of the latter.

EXAMPLE

Several experimental tests were performed in which the various process steps were carried out under different conditions. These tests led to the optimum selection of the preferred general ranges of the variables of the process of the invention, which are resumed as follows:

VARIABLE

1. Ripeness of the coconut
2. Season of cutting of the coconut
3. Speed in the hammer mill
4. Screen used in the mill
5. Pressure in the screened cushioned cone.
6. Speed of the screw of the mill
7. Speed of cone of the mill
8. Percentages of raw materials
9. Time during which the coconut cream plus additives is stirred.
10. Homogenizing pressure
11. Filling of cans.
12. Filling system.

The variation ranges of each of the above variables, were determined to be the optimum as follows:

1. Age of 7 to 12 months.
2. Difference of 2 to 4 months between cuts of the coconuts.
3. From 3500 to 12 000 r.p.m.
4. Conic, flat and inverted, having 45 holes per 0.155 in². to a holes diameter of ¼ in.
5. From 60 to 100 lb/in²
6. From 1 to 5 Rietz units
7. From 1 to 5 Rietz units
8.
  (a) Sugar — From 30 to 45%
  (b) Glucose — From 5 to 15%
  (c) Glyceryl Monostearate — From 3 to 15%
  (d) Carboxymethyl cellulose — From 0.31 to 0.49%

(e) Three types of viscosant in the indicated proportions
(f) Four types of emulsifier in the indicated proportions 9. From 5 to 37 min.
10. From 1500 to 10 000 lb/in².
11. From ½ in. from surface of cream to top of cap to total filling.
12. With or without vapor.

We claim:

1. An improved process for the production of coconut cream, which consists essentially of the steps of:
   (a) shredding and shelling the fruit of the palm tree (*Cocous nucifera*) or coconut when the fruit is ripe, manually, to leave as only useful portion, the white fresh pulp containing juice in its inside;
   (b) cracking the coconut (endosperm), separating the juice, which juice is thereafter utilized when it is clear and has no unpleasant odor, as otherwise the no good juice is discarded;
   (c) weighting the pulp and establishing a weight of coconut juice plus fresh water, which equals the weight of the pulp;
   (d) comminuting the coconut pulp while heating coconut juice plus water at the boiling temperature of the mixture so that the comminution takes place in the presence of hot aqueous liquid;
   (e) expressing under a low pressure, the mixture of comminuted pulp plus hot aqueous liquid, whereby a liquid "coconut cream" is obtained;
   (f) passing the coconut cream to a bucket having a vapor jacket wherein said coconut cream is heated;
   (g) adding to the coconut cream, one or more additives selected from the group consisting of 5 to 15% glucose, 30 to 45% sucrose, 3 to 15% glyceryl monostearate, 0.31 to 0.49% carboxymethylcellulose and mixtures thereof,
   (h) stirring the coconut cream and its additives and immediately heating the mixture;
   (i) homogenizing the liquid product of the above step and
   (j) bottling or canning the homogeneous product.

2. An improved process as recited in claim 1, wherein the trituration takes place in a hammer mill at an aproximate speed of 10,000 rpm.

3. An improved process as recited in claim 1, wherein the expresion of the mixture of triturated pulp plus hot aqueous liquid takes place in a low pressure press having an adjustable movable cone.

4. An improved process as recited in claim 1, wherein the coconut cream in step (f) is heated up to a temperature of about 74° C.

5. An improved process as recited in claim 1, wherein the mixture of coconut cream and additives in step (g) is kept under stirring during about 10 minutes.

6. An improved process as recited in claim 1, wherein the mixture of coconut cream and additives in step (h) is heated up to a temperature of 87° C, mantaining this temperature during about 20 minutes.

7. An improved process as recited in claim 1, wherein the liquid product of step (i) is homogenized under a pressure of about 1500 to 10 000 lb/in².

8. The homogenized pasturized coconut cream containing one or more additives selected from the group consisting of 5 to 15% glucose, 30 to 45% sucrose, 3 to 15%glyceryl monostearate, 0.31 to 0.49% carboxymethylcellulose and mixtures thereof, produced by the process of claim 1.

* * * * *